| United States Patent [19] | [11] | 4,216,305 |
|---|---|---|
| Carnahan | [45] | Aug. 5, 1980 |

[54] AROMATIC POLYFORMAL CARBONATES AND METHOD FOR MAKING

[75] Inventor: James C. Carnahan, Schenectady, N.Y.

[73] Assignee: General Electric Company, Schenectady, N.Y.

[21] Appl. No.: 942,952

[22] Filed: Sep. 18, 1978

[51] Int. Cl.² .............................................. C08G 63/62
[52] U.S. Cl. ................................... 528/196; 528/125; 528/171; 528/201; 528/202; 528/204; 528/205
[58] Field of Search ............... 528/196, 171, 202, 128, 528/125, 205, 201, 204; 260/860; 525/469

[56] References Cited

U.S. PATENT DOCUMENTS

| 3,069,386 | 12/1962 | Barclay, Jr. ............................. 260/49 |
| 4,117,018 | 9/1978 | Cleveland et al. .................... 528/202 |

*Primary Examiner*—Theodore E. Pertilla
*Attorney, Agent, or Firm*—William A. Teoli; James C. Davis, Jr.

[57] ABSTRACT

Aromatic polycarbonates having chemically combined bisphenol-formal dimer units are provided and method for making such materials. The aromatic polycarbonates are injection moldable and have reduced glass transition temperatures.

10 Claims, No Drawings

AROMATIC POLYFORMAL CARBONATES AND METHOD FOR MAKING

BACKGROUND OF THE INVENTION

The present invention relates to aromatic polyformal carbonates and aromatic polyformal carbonate-aromatic polycarbonate block polymers having improved characteristics with respect to processability as compared to conventional aromatic polycarbonates. The aromatic polyformal carbonate polymers of the present invention are characterized by having chemically combined formal dimer units based on the use of bisphenol-formal dimer.

Prior to the present invention, aromatic polycarbonates, generally recognized as high impact thermoplastics, had high glass transition temperatures, for example, exceeding 150° C. which sometimes interfered with their processability. As taught by Barclay U.S. Pat. 3,069,386, aromatic bisphenols used in the production of aromatic polycarbonates can be modified with formal linkages. The resulting polyformal oligomers can be phosgenated to produce thermoplastic materials exhibiting lower softening points. However, the reaction is subject to undesirable side reactions, and the final polyformal carbonate varies considerably due to the wide variation in the molecular weight of the intermediate polyformal oligomer.

As shown in copending application of Allan S. Hay, Ser. No. 889,393 filed Mar. 23, 1978 and assigned to the same assignee as the present invention, a reaction between bisphenol of the formula, $$\text{HOROH}, \quad (1)$$

where R is a $C_{(6-30)}$ divalent aromatic radical, methylene halide, base, and an organic solvent, also can result in a mixture of film forming polyformals and cyclopolyformals. The direct phosgenation of such mixture can be complicated by the presence of the cyclopolyformals.

STATEMENT OF THE INVENTION

The present invention is based on the discovery that bisphenol dimers of the formula, $$\text{HOROR}^1\text{OROH}, \quad (2)$$

where R is as previously defined and $R^1$ is a $C_{(1-13)}$ alkylene or alkylenearylene organic radical, shown in my copending application Ser. No. 942,956, filed Sept. 18, 1978 and assigned to the same assignee as the present invention, can be made free of cyclopolyformals by effecting reaction between a monocapped bisphenoxide salt of the formula,

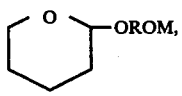—OROM, (3)

and a dihalo organic compound of the formula, $$R^1X_2, \quad (4)$$

where R and $R^1$ are as previously defined, X is a halogen radical, such as chloro or bromo and M is an alkali metal ion. The monocapped phenoxide salt of formula (3) can be made by my method shown in copending application Ser. No. 942,957, filed Sept. 18, 1978 and assigned to the same assignee as the present invention, based on the reaction under acid conditions between a bisphenol of formula (1) and dihydropyran followed by contacting the resulting partially capped bisphenol with an alkali metal hydroxide, such as sodium hydroxide, potassium hydroxide, etc.

The bisphenol dimer of formula (2), or a mixture of such bisphenol dimer with bisphenol of formula (1), can be phosgenated to produce aromatic poly(formal carbonate) comprising at least 1% by weight of chemically combined units of the formula,

or blocks of such units chemically combined with up to about 99% by weight of blocks of polycarbonate units of the formula,

which aromatic polyformal carbonate or "formal-carbonate" exhibits uniform high performance thermoplastic properties along with improved processing characteristics, where R and $R^1$ are as previously defined.

Radicals included within R of formulas 1-3, 5 and 6 are selected from $C_{(6-30)}$ divalent aromatic hydrocarbon radicals and halogenated derivatives thereof, for example, phenylene, tolylene, xylylene, naphthalene, etc.; halogenated derivatives of such divalent aromatic hydrocarbon radicals, such as chlorophenylene, bromotolylene, etc., divalent radicals, such as —$R^2QR^2$—, where $R^2$ is selected from $C_{(6-13)}$ divalent aromatic radicals, Q can be cyclohexyl, fluorenyl, —O—, —S—,

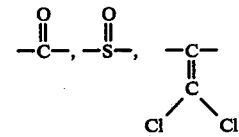

and —$C_xH_{2x}$—, where x is equal to 1 to 5 inclusive. Radicals included with $R^1$ of formulas 2, 4 and 5 are —$CH_2$—, —$CH_2C_6H_4CH_2$—, etc.

There are included within the bisphenols of formula (1)

2,2-bis-(2-hydroxyphenyl)propane;
2,4'-dihydroxydiphenylmethane;
bis-(2-hydroxyphenyl)-methane;
2,2-bis-(4-hydroxyphenyl)-propane, hereinafter identified as "bisphenol-A" or "BPA";
1,1-bis-(4-hydroxyphenyl)-ethane;
1,1-bis(4-hydroxyphenyl)-propane;
2,2-bis-(4-hydroxyphenyl)-pentane;
3,3-bis-(4-hydroxyphenyl)-pentane;
4,4'-dihydroxybiphenyl;
4,4'-dihydroxy-3,3',5,5'-tetramethylbiphenyl;
2,4'-dihydroxybenzophenone;
4,4'-dihydroxydiphenylsulfone;
2,4'-dihydroxydiphenylsulfone;
4,4'-dihydroxydiphenyl sulfoxide;
4,4'-dihydroxydiphenyl sulfide; etc.

The formal-carbonates of the present invention are to be distinguished from the block polymers of Relles et al Ser. No. 942,950 filed Sept. 18, 1978 and assigned to the same assignee as the present invention. The block polymers of Relles et al can be made by phosgenating a mixture of an aromatic bisphenol included within formula (1), and a polyformal oligomer which can be made by effecting reaction between an alkylene halide, such as methylene chloride, or dibromomethane and a bisphenol within the scope of formula (1) in the presence of a base such as an alkali metal hydroxide and an organic solvent, or by the employment of such alkylene halide with a preformed bisphenoxide alkali metal salt and an organic solvent.

The formal-carbonates are film forming, clear, colorless thermoplastics having improved UV stability and hydrolytic stability as compared to conventional polycarbonates. The formal carbonates can be blended with other thermoplastic organic resins, such as Lexan polycarbonate, PPO polyphenylene oxide, and Valox polyester where all of the aforesaid thermoplastic organic resin are products of the General Electric Company, over wide proportions by weight, such as 1% to 99% of the formal-carbonate and 99% to 1% of the high performance thermoplastic organic resin. In addition, the formal-carbonates also can be blended with various fillers, such as glass fiber, silicon carbide whiskers, silica fillers, etc., stabilizers, pigments, flame retardants, etc., in amounts of up to 1 to 100 parts of filler per 100 parts of formal-carbonate.

In the practice of the invention, the formal-carbonates can be made by standard phosgenation procedures of bisphenol dimer of formula (2), or a mixture of such bisphenol dimer in combination with the bisphenol of formula (1) and optionally with a chain stopper. In instances where formal-carbonates are desired, having chemically combined polycarbonate blocks, a proportion of from 1 to 100 moles of bisphenol, and 0.005 to 0.03 moles of chain stopper, per mole of the bisphenol dimer can be employed.

During phosgenation, agitation of the mixture as well as the employment of a suitable organic solvent has been found to facilitate the formation of formal-carbonate. A suitable organic solvent includes, for example, chlorobenzene, methylene chloride, etc., while any organic solvent which is inert to the reactant and sufficiently high in boiling point to achieve satisfactory results can be employed. A temperature of between 0° C. to 135° C. can be utilized during phosgenation and preferably a temperature between 25° C. to 100° C. Phosgenation can be continued until no further increase in the viscosity of the mixture is experienced or until the introduction of phosgene into the mixture results in no further reaction. Separation of the formal-carbonate can be effected by conventional precipitation, washing and filtering procedures.

In order that those skilled in the art will be better able to practice the present invention, the following examples are given by way of illustration and not by way of limitation. All parts are by weight.

EXAMPLE 1

There was added 0.3 part of toluene sulfonic acid to a solution of 57 parts of bisphenol-A and about 300 parts of anhydrous diethylether. After the addition of the condensation catalyst was completed, there was added 21 parts of dihydropyran over a 3 minute period in the form of a 50% solution in diethylether. The reaction was found to be exothermic during the addition and the mixture was refluxed for an additional hour. Analysis of a titer of the mixture with a gel permeation chromatograph showed that the condensation was complete.

There was then added a 25% aqueous solution of sodium hydroxide to the above condensation reaction mixture resulting in the formation of a precipitate. During the addition, the mixture was rapidly stirred. The addition of the sodium hydroxide solution was continued until no further precipitation occurred. The diethylether was then decanted from the mixture and the resulting precipitate was slurried with hot diethylether 3 times and then filtered. The solid filler cake was then washed with additional diethylether and allowed to dry. There was obtained 40.7 parts of the monocapped salt of bisphenol-A having the formula,

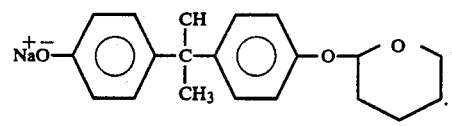

The identity of the above monocapped bisphenol salt hydrate was established by its C-13 and proton NMR and its IR spectra.

A mixture of 66.8 parts of the above monosodium salt of bisphenol-A monocapped with dihydropyran, 1 part of ground sodium hydroxide, and 240 parts of N-methylpyrrolidone was stirred and warmed to 35° C. to facilitate the dissolution of the various solids. There was then added to the resulting mixture, 212 parts of dichloromethane and the mixture was heated at 50° C. for 1 hour. The mixture was then allowed to cool and there was added about 50 parts of water. The mixture was then acidified with a 20% by weight of aqueous acetic acid to a pH of 6. There was added to the resulting acidified mixture about 100 parts of a 6N hydrochloric acid and the resulting mixture was stirred for 1¼ hours at 35° C. After the completion of the hydrolysis of the reaction product, it was extracted into ether and washed with water and sodium bicarbonate until neutral. An oil was formed upon removal of the diethylether. The oil was dissolved in chloroform and the chloroform solution was triturated with hexane resulting in the formation of 36 parts of a white crystalline solid having a melting point of 130–131.5. Based on method of preparation and its NMR and IR spectra, the product was

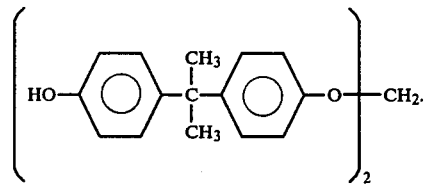

Phosgene was bubbled into a stirred mixture of 100 parts of the above bisphenol linear formal dimer, 0.86 part of p-cumyl phenol, 0.7 part of triethylamine, 700 parts of methylene chloride and 180 parts of water, which had been adjusted to a pH of 11 with a 20% sodium hydroxide solution. The phosgenation was continued for 15 minutes while maintaining the mixture between a pH of 10 and 11 with the addition of added amounts of the sodium hydroxide solution. The phases were allowed to separate and the methylene chloride solution was washed several times with dilute hydrochloric acid, and then with water. The methylene chloride solution was then added to rapidly stirred methanol resulting in the precipitation of product. The product was recovered by filtration, washed with methanol and dried. There was obtained 90 parts of a formal carbonate consisting essentially of units of the formula,

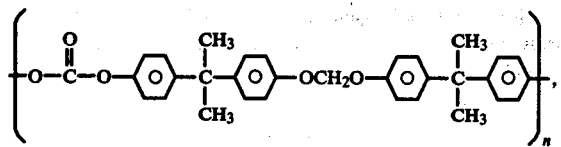

and having terminal units of the formula,

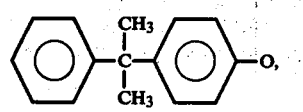

where n has an average value of about 200. The identity of the product was confirmed by its $^{13}C$ NMR spectrum. The formal carbonate had an intrinsic viscosity of 0.537 in methylene chloride at 25° C. and a glass transition temperature of 100° C. Based on its characteristics, those skilled in the art would know that it was a valuable injection molding material capable of being subjected to temperatures up to 100° C. without suffering a substantial change in shape.

EXAMPLE 2

In accordance with the procedure of Example 1, there was phosgenated a stirred mixture of 68 parts of the linear formal dimer, 33 parts of bisphenol-A, 0.43 part of phenol, 0.7 part of triethylamine, 700 parts of methylene chloride, and 180 parts of water which had been adjusted to a pH of 11 using a 20% sodium hydroxide solution. Phosgenation of the mixture was continued for 15 minutes while maintaining the pH of the mixture between 10 and 11. There was obtained 94 parts of a formal-carbonate consisting essentially of chemically combined linear formal dimer units, and bisphenol-A carbonate units. More particularly, the formal carbonate was found to consist essentially of about 67% by weight of the following units,

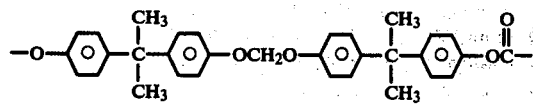

chemically combined with about 33% by weight of the following units,

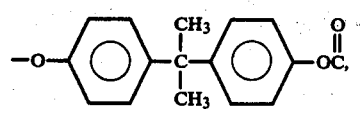

and terminated with chemically combined units of the formula,

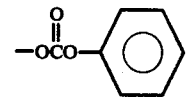

The identity of the product was confirmed by its $^{13}C$ NMR spectrum. The formal carbonate was found to have an intrinsic viscosity of 0.78 and a $T_g$ of 125° C.; GTC ($CH_2Cl_2$), $M_w$=116,490, $M_n$=12.563, $M_z$=219,208. In addition, a formal carbonate was cast to produce 5 mil films to determine its tensile measurements in accordance with ASTM D882-756. The following results were obtained:

| Stress ($\times 10^3$ psi) | | Elongation % | | Maximum |
|---|---|---|---|---|
| at yield | at break | at yield | at break | Elongation % |
| 7.3 | 6.6 | 4 | — | 230 |

EXAMPLE 3

There was added 0.3 part of toluene sulfonic acid to a solution of 70 parts of 2,2(4-hydroxyphenyl)1,1-dichloroethylene and about 500 parts of anhydrous diethylether. After The addition of the condensation catalyst was completed, there was added 21 parts of dihydropyran over a 3 minute period in the form of a 50% solution in diethylether. The reaction was found to be exothermic during the addition and the mixture was refluxed for an additional hour. Analysis of a titer of the mixture with a gel permeation chromatograph showed that the condensation was complete.

There was added 25% aqueous solution of sodium hydroxide to the above condensation reaction mixture resulting in the formation of a precipitate. During the addition, the mixture was rapidly stirred. The addition of the sodium hydroxide solution was continued until no further precipitation occurred. The diethylether was then decanted from the mixture and the resulting precipitate was slurried with hot diethyl ether 3 times and then filtered. The solid filler cake was then washed with additional diethylether and allowed to dry. There was obtained 43.4 parts of the monocapped salt of 2,2(4-hydroxyphenyl)-1,1-dichloroethylene.

A mixture of 8.82 parts of the above monosodium salt of 1,1-dichloroethylidene bisphenol capped with dihydropyran, 1 part of ground sodium hydroxide, 60 parts N-methylpyrrolidone and 53 parts dichloromethane was heated at 70° C. for 1 hour. The mixture was allowed to cool. There was added 100 parts water and the mixture extracted with 100 parts water eight times.

The dichloromethane layer was dried and the solvent removed. The resulting oil was suspended in 80 parts 1:1 ether: methanol and 10 parts 37% aqueous hydrochloric acid was added. The suspension was stirred rapidly at 50° C. for 1 hour. There was added 25 parts of ether and the mixture extracted with water until neutral. The ether layer was dried and the solvent removed. The resulting oil was taken up in chloroform and hexane was added yielding 3.35 parts of a white crystalline solid M.P. 163°-166° C.; recrystallization from chloroform and hexane gave material of M.P. 165°-167° C. Based on the method of preparation and its NMR and IR spectra the product was

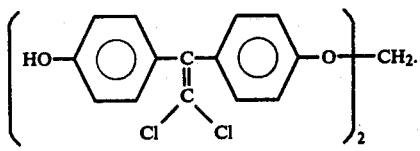

In accordance with the procedure of Example 2, a stirred mixture is phosgenated consisting of 10 parts of the above linear formal dimer, 90 parts of bisphenol-A, 2 parts of triethylamine, about 1 part of phenol, 420 parts of methylene chloride and 180 parts of water. Phosgenation is continued while the pH is maintained between 10 and 11.5 until all of the phenolic hydroxy groups are reacted. There is obtained a formal-carbonate consisting essentially of about 10% by weight of chloroethylene bisphenol-A carbonate units of the formula,

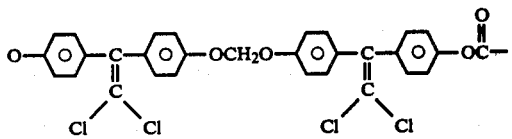

chemically combined with about 90% by weight of bisphenol-A-carbonate units of the formula,

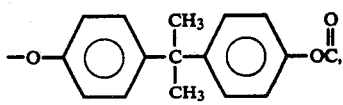

and having terminal phenoxy units of the formula,

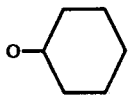

The above polyformal carbonate and polyformal carbonate block polymer having about 30% by weight of dichloroethylidene bisphenol carbonate units and about 70% by weight of bisphenol-A carbonate units are found to be valuable flame retardant injection moldable thermoplastics.

Although the above examples are directed to only a few of the very many formal carbonates which can be made in accordance with the present invention, it should be understood that the present invention is directed to a much broader class of formal carbonates consisting essentially of chemically combined units of formula (5) or such units combined with blocks of polycarbonate of formula (6).

What I claim as new and desire to secure by Letters Patent of the United States is:

1. Injection moldable poly(formalcarbonates, having a reduced glass transition temperature, consisting essentially of at least 1% by weight of chemically combined units of the formula,

or blocks of such units chemically combined with up to 99% by weight of blocks of polycarbonate units of the formula,

where R is a divalent aromatic hydrocarbon radical selected from the class consisting of phenylene, tolylene, xylylene, naphthalene, halogenated derivatives thereof and $-R^2QR^2-$, where $R^2$ is selected from $C_{(6-13)}$ divalent aromatic radicals, Q can be cyclohexyl, fluorenyl,

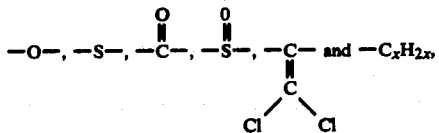

where x is equal to 1 to 5 inclusive, and $R^1$ is selected from $-CH_2-$ and $-CH_2C_6H_5CH_2-$.

2. Aromatic poly(formal carbonates) in accordance with claim 1, where R is

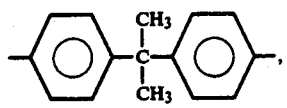

and $R^1$ is $CH_2$.

3. Aromatic poly(formal carbonates) in accordance with claim 1, where R is

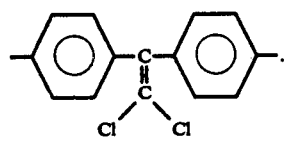

4. Aromatic poly(formal carbonates) in accordance with claim 1, where $R^1$ is $-CH_2C_6H_4CH_2-$.

5. Aromatic poly(formal carbonates) in accordance with claim 1, comprising chemically combined

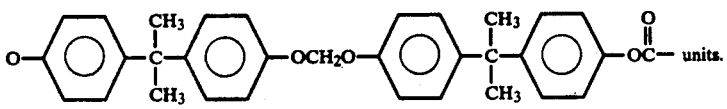 units.

6. Aromatic poly(formal carbonates) in accordance with claim 1, comprising chemically combined

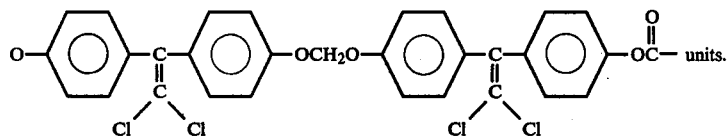

7. Aromatic poly(formal carbonates) in accordance with claim 1, comprising about 67% by weight of

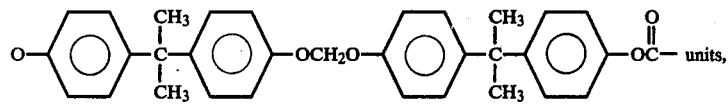

chemically combined with about 33% by weight of

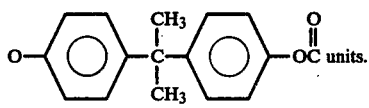

8. Aromatic poly(formal carbonates) in accordance with claim 1, comprising about 10% by weight of

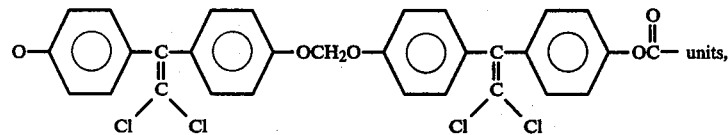

chemically combined with about 90% by weight of

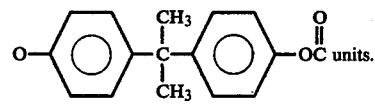

9. Aromatic poly(formal carbonates) in accordance with claim 1, comprising about 90% by weight of

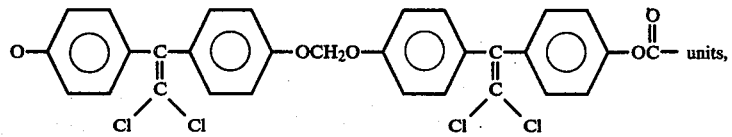

chemically combined with about 10% by weight of

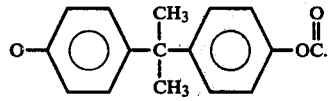

10. Aromatic poly(formal carbonate) of claim 1, having terminal phenoxy units.

* * * * *